(12) United States Patent
Lai et al.

(10) Patent No.: US 10,127,170 B2
(45) Date of Patent: Nov. 13, 2018

(54) HIGH DENSITY SERIAL OVER LAN MANAGEMENT SYSTEM

(71) Applicant: Quanta Computer Inc., Taoyuan (TW)

(72) Inventors: Te-Hsien Lai, Taoyuan (TW); Kai-Pei Chou, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 237 days.

(21) Appl. No.: 14/723,932

(22) Filed: May 28, 2015

(65) Prior Publication Data

US 2016/0080210 A1 Mar. 17, 2016

(30) Foreign Application Priority Data

Sep. 11, 2014 (TW) .............................. 103131315 A

(51) Int. Cl.
| | | |
|---|---|---|
| *H04L 12/24* | (2006.01) | |
| *G06F 13/38* | (2006.01) | |
| *G06F 13/20* | (2006.01) | |
| *G06F 13/42* | (2006.01) | |

(52) U.S. Cl.
CPC ............ *G06F 13/382* (2013.01); *G06F 13/20* (2013.01); *G06F 13/4282* (2013.01)

(58) Field of Classification Search
CPC ....... H04L 41/12; G06F 13/20; G06F 13/382; G06F 13/4282
USPC ........................................................ 709/224
See application file for complete search history.

(56) References Cited

U.S. PATENT DOCUMENTS

| | | | | |
|---|---|---|---|---|
| 7,424,419 | B1* | 9/2008 | Fike ..................... | G06F 13/385 703/23 |
| 8,055,934 | B1* | 11/2011 | Blinick ............... | G06F 11/0727 714/10 |
| 2004/0228063 | A1* | 11/2004 | Hawkins ............. | G06F 13/4291 361/115 |
| 2007/0226377 | A1* | 9/2007 | Jreij ..................... | G06F 13/385 710/8 |
| 2007/0233455 | A1* | 10/2007 | Zimmer .................. | G06F 9/546 703/27 |
| 2008/0201501 | A1* | 8/2008 | Partani .................... | H04L 41/04 710/60 |
| 2008/0291210 | A1* | 11/2008 | Partani .................. | G06F 3/1462 345/545 |
| 2012/0054389 | A1* | 3/2012 | Lee ..................... | G06F 13/4036 710/106 |
| 2012/0151004 | A1* | 6/2012 | Pope ..................... | G06F 13/102 709/219 |
| 2013/0151826 | A1 | 6/2013 | Tu | |

(Continued)

FOREIGN PATENT DOCUMENTS

CN 103164354 A 6/2013

OTHER PUBLICATIONS

Taiwanese Office Action dated Mar. 28, 2016.

*Primary Examiner* — Moustafa M Meky
*Assistant Examiner* — Elizabeth Kassa
(74) *Attorney, Agent, or Firm* — Nixon Peabody LLP; Eduardo J. Quiñones

(57) ABSTRACT

A baseboard management controller (BMC) of a system can receive a first serial output from a first server device and a second serial output from a second server device. The BMC can send the first serial output and the second serial output to a network interface controller (NIC) for transmission over a network to a computing device.

20 Claims, 6 Drawing Sheets

(56) References Cited

U.S. PATENT DOCUMENTS

| | | | |
|---|---|---|---|
| 2013/0339031 A1* | 12/2013 | Yoon | G10L 15/22 |
| | | | 704/275 |
| 2014/0088788 A1* | 3/2014 | Wang | H05K 7/1498 |
| | | | 700/300 |
| 2014/0195657 A1 | 7/2014 | Bhatia et al. | |
| 2014/0289570 A1* | 9/2014 | Lewis | G06F 11/3089 |
| | | | 714/43 |
| 2014/0337496 A1* | 11/2014 | Ramachandran | H04L 41/24 |
| | | | 709/223 |
| 2014/0344431 A1* | 11/2014 | Hsu | H04L 41/044 |
| | | | 709/223 |
| 2015/0006767 A1* | 1/2015 | Lu | G06F 13/382 |
| | | | 710/22 |
| 2015/0363340 A1* | 12/2015 | Kelly | G06F 13/102 |
| | | | 710/52 |
| 2016/0028804 A1* | 1/2016 | Partani | G06F 13/4295 |
| | | | 709/248 |

* cited by examiner

HIGH DENSITY SERIAL OVER LAN MANAGEMENT SYSTEM

CROSS-REFERENCE TO RELATED APPLICATIONS

This application claims priority to and the benefit of Taiwan Patent Application No. 103131315, filed Sep. 11, 2014, the contents of which are hereby incorporated by reference in their entirety.

FIELD

This application relates to managed computer systems, and more particularly to a system and method for managing serial output from multiple servers.

BACKGROUND

A number of techniques have been developed to remotely manage the operation of computer servers in a manner that provides accessibility, consistency, and efficiency. Remote management allows the removal of input/output interfaces (e.g., monitors, keyboards, and mice) for the servers. For example, large data centers containing numerous rack servers are commonly managed using a variety of remote management tools, such as simple terminal connections, remote desktop applications, and software tools used to configure, monitor, and troubleshoot server hardware and software.

Many server devices include serial ports that are not connected to traditional serial port sockets. To manage these server devices through the serial ports, data through the serial ports can be redirected over an Internet Protocol (IP) network. Serial Over Local Area Network (SOL) is a technique that enables the data through the serial ports of the server devices to be redirected over the IP network.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a method is provided for serial over local area network (SOL) management. A baseboard management controller (BMC) of a system receives a first serial output from a first server device and a second serial output from a second server device. The BMC sends the first serial output and the second serial output to a network interface controller (NIC) for transmission over a network to a computing device.

In some implementations, a system includes a first server device, a second server device, a NIC, BMC, and a non-transitory computer-readable medium. The non-transitory computer-readable medium includes one or more sequences of instructions which, when executed by the BMC, causes the BMC to: receive a first serial output from the first server, receive a second serial output from the second server, send the first serial output and the second serial output to the NIC for transmission over a network to a computing device.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for redirecting serial output from multiple servers using a single baseboard management controller. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. Any embodiment described herein as an "example" is not necessarily to be construed as preferred or advantageous over other embodiments.

In traditional server system architecture, each server device may need a separate baseboard management controller (BMC) to provide support for serial over local area network (SOL), which enables serial data output transmitted through the serial ports of the server devices to be redirected over the IP network. As server device density (e.g., the number of servers in a rack, data center, etc.) increase, the number of BMCs required to redirect serial output increases and the cost associated with providing a BMC to each server rises. The subject disclosure provides a system and method for reducing the number of BMCs in server system architecture by allowing a single BMC to provide support for SOL for a plurality of server devices.

Figure 1:
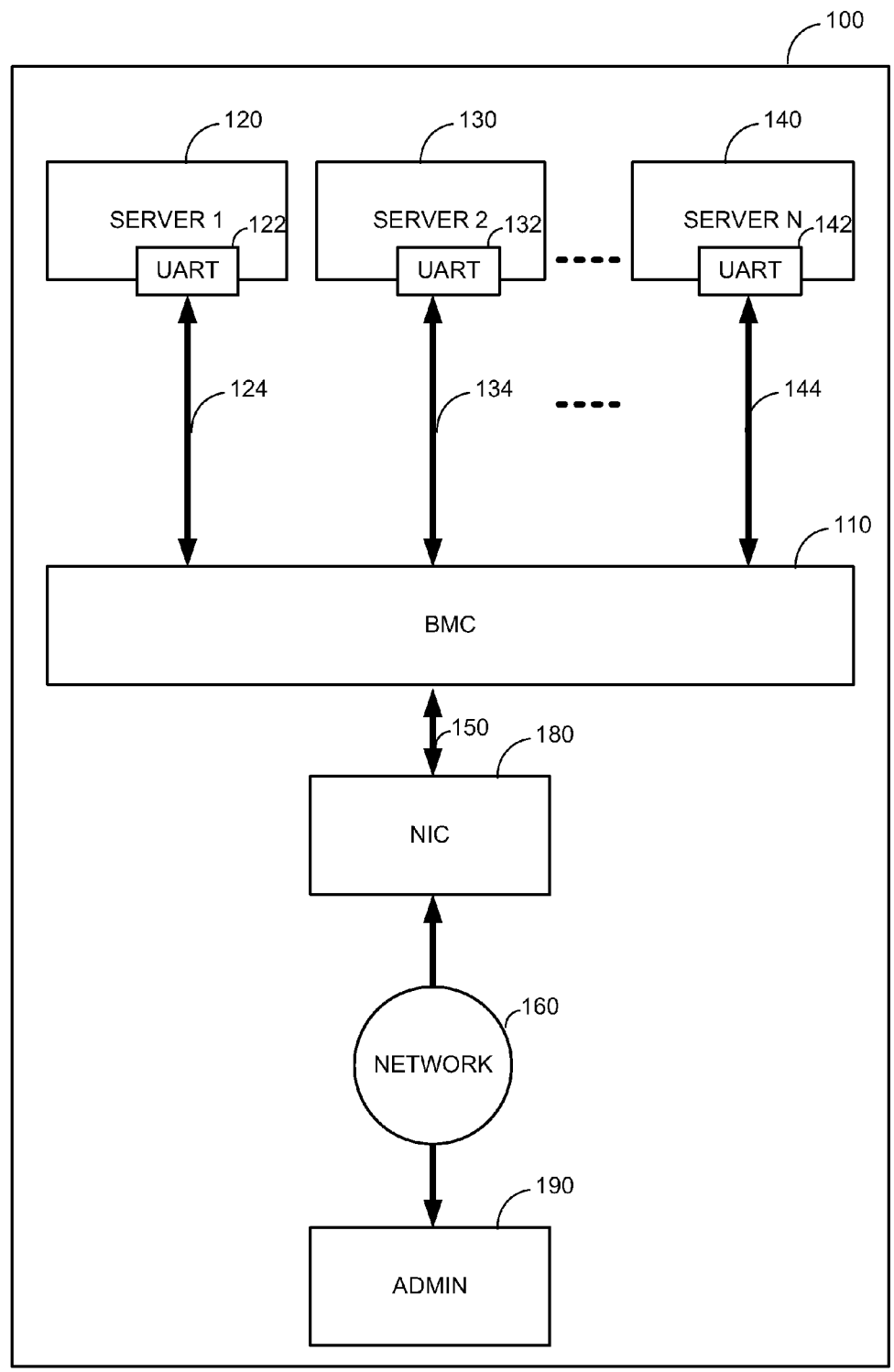
FIG. 1 illustrates a block diagram of an example system for managing serial output from multiple servers using a single BMC.

FIG. 1 illustrates a block diagram of an example system 100 for managing serial output from multiple servers using a single BMC. The system 100 can include an N number of server devices 120, 130 . . . , 140 (e.g., application servers, database servers, file servers, game servers, web servers). Each of the server devices 120, 130 . . . , 140 can generate various serial output (e.g., operational status, sensor data, log data, error data) for use by a user/administrator for debugging and/or analyzing system operations. Similarly, the each of the server devices 120, 130 . . . , 140 can receive various network commands (e.g., power on/off, power cycle, request for status) in the form of serial output.

In some implementations, the user/administrator can view the serial output by connecting a monitor or other display device to the server device 120, 130 . . . , 140. The server device 120, 130 . . . , 140 can transmit the serial output to the administrator's display device so that the administrator can view the output and analyze the operation of the server device 120, 130 . . . , 140.

In some implementations, BMC 110 can redirect serial output (e.g., console messages) received from server devices 120, 130 . . . , 140 over a network 160 to administrator device 190. For example, the server devices 120, 130 . . . , 140 can send the serial output to BMC 110 for transmission to an administrator device 190 over the network 160. The BMC 110 can be configured to connect with multiple server devices 120, 130 . . . , 140. For example, the BMC 110 can connect to the server devices 120, 130 . . . , 140 using Universal Asynchronous Receiver/Transmitter (UART) protocol.

In some implementations, each of the server devices 120, 130 . . . , 140 can include a Universal Asynchronous Receiver/Transmitter (UART) 122, 132 . . . , and 142 to transmit the serial output using UART protocol. A UART is an electronic device that translates data between parallel and serial formats. Each UART transmitter can transmit bytes of data sequentially in individual bits. A UART receiver can then reassemble the bits into bytes. Each UART can include a shift register to convert data between serial and parallel formats. The UARTs 122, 132 . . . , and 142 of the server devices 120, 130 . . . , 140 can send serial output to the BMC 110 through serial buses 124, 134 . . . , and 144, transmitted according to UART protocol. The UARTs 122, 132 . . . , and 142 of the server devices 120, 130 . . . , 140 can also receive network commands, given by the administrator device 190, from the BMC 110 through serial buses 124, 134 . . . , and 144, transmitted according to UART protocol.

The BMC 110 can include a microcontroller that manages interfaces between system management software and platform hardware. Different types of sensors built into the computer system can report to the BMC 110 on parameters such as temperature, cooling fan speeds, power status, operating system status, etc. The BMC 110 can monitor the sensors and have the ability to send alerts to an administrator device 190 through a network 160. The BMC 110 can receive serial output through the serial buses 124, 134 . . . , and 144 from the UARTs 122, 132 . . . , and 142 of the server devices 120, 130 . . . , 140. The BMC 110 can also send network commands through the serial buses 124, 134 . . . , and 144 to the UARTs 122, 132 . . . , and 142 of the server devices 120, 130 . . . , 140.

In some implementations, the BMC 110 can include a plurality of UART interfaces connecting the BMC 110, through the serial buses 124, 134 . . . , and 144, to the server devices 120, 130 . . . , 140. In some other implementations, the BMC 110 can forgo UART interfaces and, for example, communicate with the server devices 120, 130 . . . , 140 using a direct serial bus connection.

The BMC 110 can connect to the NIC 180 through a connection 150. For example, BMC 110 can communicate (e.g., send data, receive commands) with external devices through NIC 180 using the Intelligent Platform Management Interface (IPMI) protocol. IPMI is a set of specifications for an autonomous computer subsystem that manages and monitors a computer system's central processing unit (CPU), firmware, and operating system, and for out-of-band management and monitoring by system administrators. The connection 150 can include any bus interface (e.g., a system management bus (SMBus), a RS-232 serial bus, or an Intelligent Platform Management Bus (IPMB)). The BMC 110 can send serial output through the connection 150 to the NIC 180. The BMC 110 can also receive network commands through the connection 150 from the NIC 180.

The NIC 180 can include network interface controller (e.g., a processor, microcontroller, etc.) that connects to the BMC 110 through a connection 150. The NIC 180 can receive serial output through the connection 150 from the BMC 110. The NIC 180 can also send network commands from the administrator device 190 through the connection 150 to the NIC 180.

The NIC 180 can connect to the administrator device 190 through a network 160. The network 160 can, for example, include a local area network (LAN) or a wide area network such as the Internet. The administrator device 190 can be a device such as a computer system that receives serial output or sends network commands to manage the server devices 120, 130 . . . , 140. The administrator device 190 can receive the serial data through the network 160 from the NIC 180. The administrator device 190 can also send network commands through the network 160 to the NIC 180.

Figure 2:
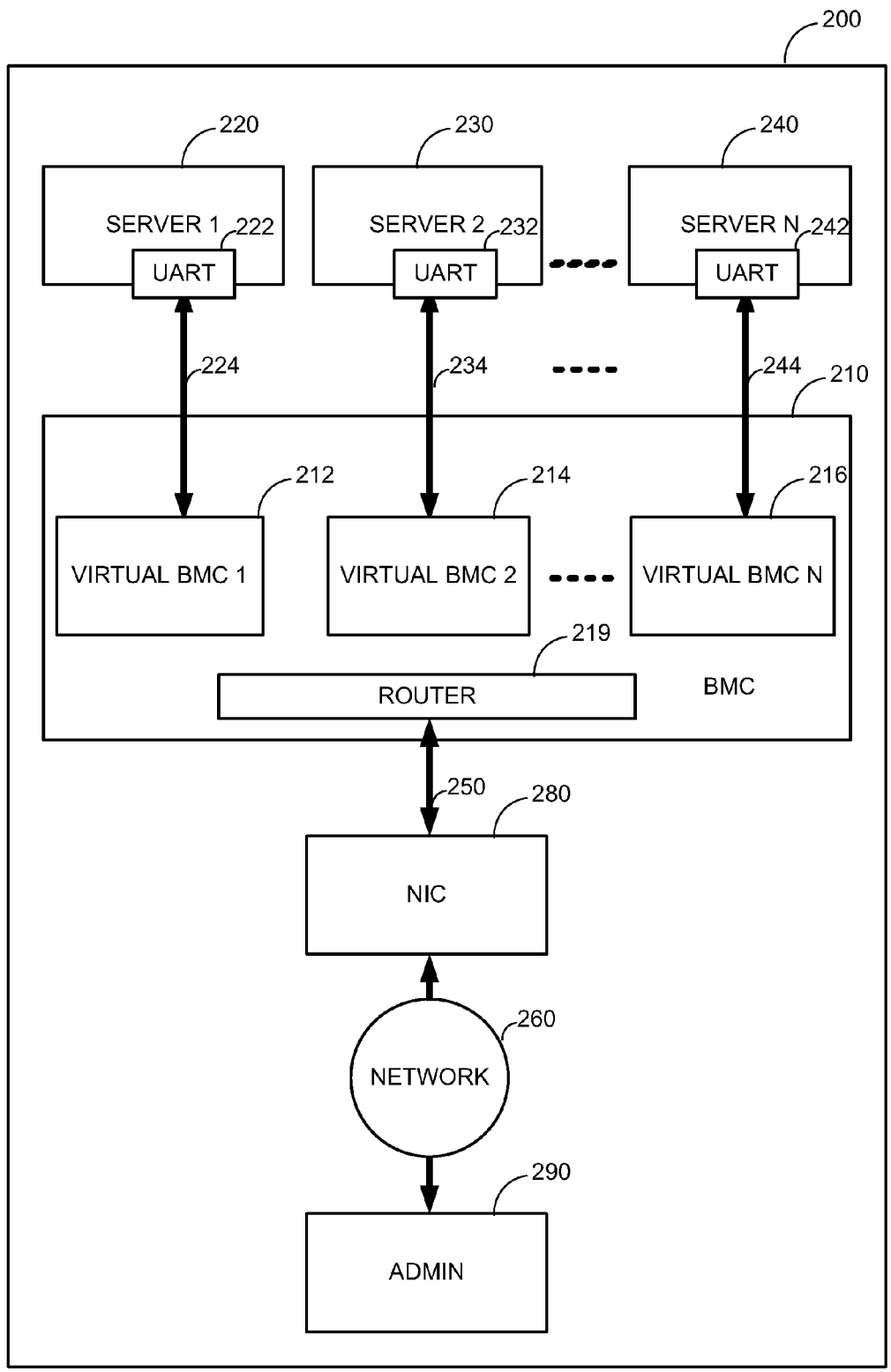
FIG. 2 illustrates a block diagram of an example system for managing serial output from multiple servers using a BMC that emulates multiple virtual BMCs.

FIG. 2 illustrates a block diagram of an example system 200 for managing serial output from multiple servers using a BMC that emulates multiple virtual BMCs. The system 200 can include an N number of server devices 220, 230 . . . , 240 (e.g., application servers, database servers, file servers, game servers, web servers). Each of the server devices 220, 230 . . . , 240 can generate various serial output (e.g., operational status, sensor data, log data, error data) for use by a user/administrator for debugging and/or analyzing system operations. Similarly, the each of the server devices 220, 230 . . . , 240 can receive commands (e.g., power on/off, power cycle, request for status) from BMC 210 or virtual BMCs 212, 214 or 216.

In some implementations, BMC 210 (or virtual BMC 212, 214, 216) can be redirect serial output data over a network 260 to an administrator device 290. For example, server devices 220, 230 . . . , 240 can send the serial output to BMC 210 for transmission to the administrator device 290 over the network 260.

In some implementations, instead of requiring multiple BMCs to redirect serial output for each of the server devices 220, 230 . . . , 240, BMC 210 can emulate a plurality of virtual BMCs 212, 214 . . . , and 216. For example, the BMC 210 can emulate the virtual BMCs 212, 214 . . . , and 216 with software running on an embedded operating system of the BMC 210. In some implementations, a virtual BMC can be emulated for each server in the server system. Each of the virtual BMCs 212, 214 . . . , and 216 can perform similar tasks as a traditional BMC for each server device in traditional server system architecture.

In some implementations, each of the server devices 220, 230 . . . , 240 can include a UART for transmitting or receiving serial output. The server devices 220, 230 . . . , 240 can communicate with the BMC 210 through serial buses 224, 234 . . . , and 244, transmitted according to UART protocol.

In some implementations, the BMC 210 can include a plurality of UART interfaces connecting the BMC 210, through the serial buses 224, 234 . . . , and 244, to the server devices 220, 230 . . . , 240. In some other implementations, the BMC 210 can forgo UART interfaces and, for example, communicate directly with each server over a serial bus interface.

The BMC 210 can receive serial output through the serial buses 224, 234 . . . , and 244 from the UARTs 222, 232 . . . , and 242 of the server devices 220, 230 . . . , 240. The BMC 210 can also send network commands through the serial buses 224, 234 . . . , and 244 to the UARTs 222, 232 . . . , and 242 of the server devices 220, 230 . . . , 240.

The BMC 210 can communicate with the administrator device 290 through a NIC 280. In some implementations, the BMC 210 can include a router 219 that distinguishes each of the virtual BMCs 212, 214 . . . , 216 in communicating with the administrator device 290 through the NIC 280. For example, the router 219 receive serial output data from each virtual BMC 212, 214 . . . , 216 and forward the serial output data to NIC 280. The router 219 can receive administrator commands from NIC 280, determine which virtual BMC 212, 214 . . . , 216 is the intended recipient of the command, and forward the command to the correct virtual BMC. For example, an administrator command received by NIC 280 from administrator device 290 can identify which server device 220, 230 . . . , 240 is the intended recipient of the administrator command and router 219 can forward the command to the virtual BMC associated with the identified server. For example, the administrator command can be a command message conforming to the IPMI protocol described above. In some implementations, the router can be software running on the embedded operating system of the BMC 210.

The BMC 210 can connect to a NIC 280 through a connection 250. The connection 250 can include any bus interface (e.g., SMBus, RS-232, or IPMB). The BMC 210 can send serial output through the connection 250 to the NIC 280. The BMC 210 can also receive network commands through the connection 250 from the NIC 280.

The NIC 280 can include a network interface controller that connects to the BMC 210 through a connection 250. The NIC 280 can receive serial output through the connection 250 from the BMC 210. The NIC 280 can also send network commands received from the administrator device 290 through the connection 250 to BMC 210.

The NIC 280 can connect to the administrator device 290 through a network 260. The network 260 can, for example, include a LAN or a wide area network such as the Internet. The administrator device 290 can be a device such as a computer system that receives serial output or sends network commands to manage the server devices 220, 230 . . . , 240. The administrator device 290 can receive the serial data through the network 260 from the NIC 280. The administrator device 290 can also send network commands through the network 260 to the NIC 280.

Figure 3:
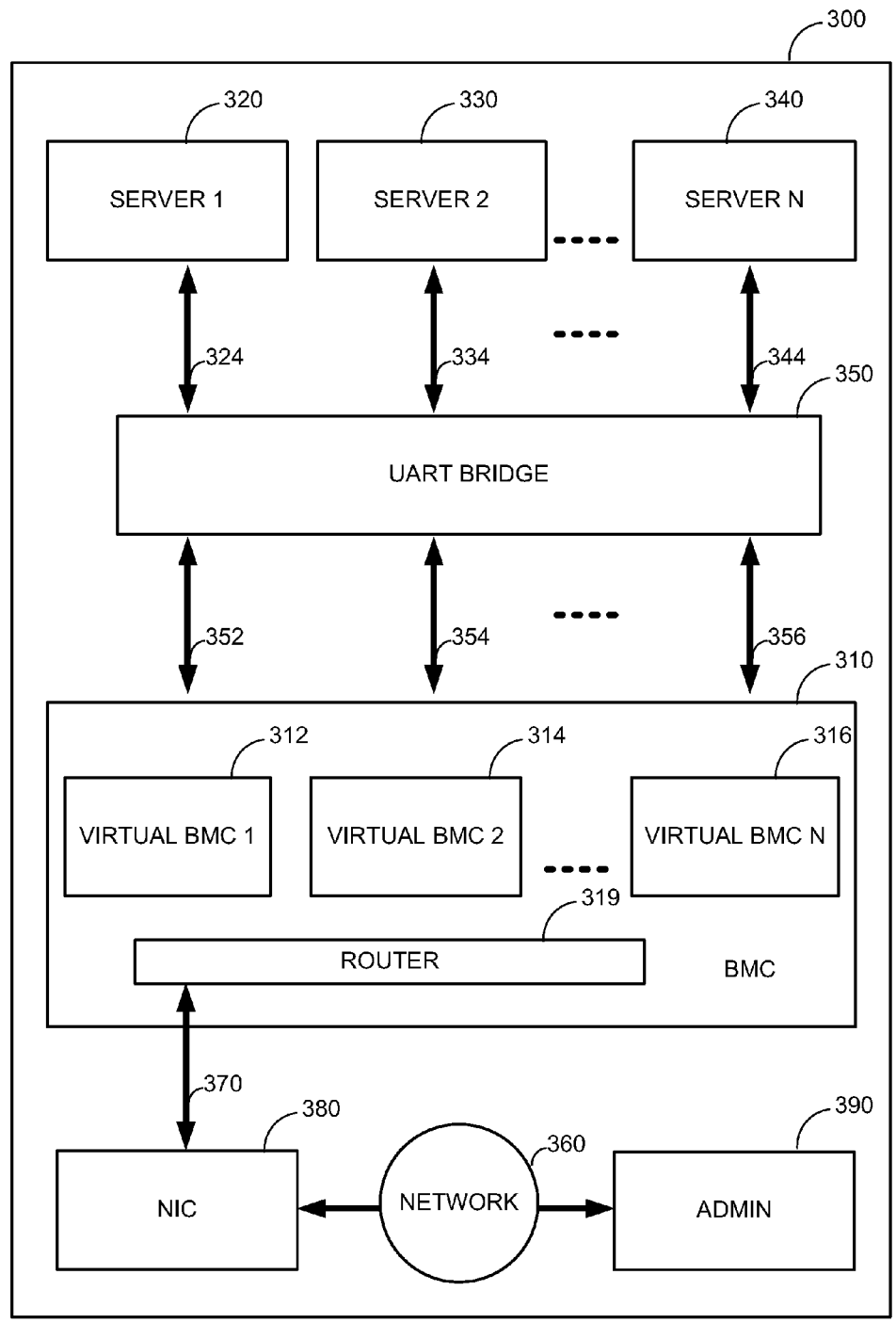
FIG. 3 illustrates a block diagram of an example system for managing serial output from multiple servers using a BMC with multiple connections to a bridge.

FIG. 3 illustrates a block diagram of an example system 300 for managing serial output from multiple servers using a BMC with multiple connections to a bridge. The system 300 can include an N number of server devices 320, 330 . . . , 340 (e.g., application servers, database servers, file servers, game servers, web servers). Each of the server devices 320, 330 . . . , 340 can generate various serial output (e.g., operational status, sensor data, log data, error data) for use by a user/administrator for debugging and/or analyzing system operations. Similarly, the each of the server devices 320, 330 . . . , 340 can receive various network commands (e.g., power on/off, power cycle, request for status) in the form of serial output.

In some implementations, BMC 310 can redirect serial output received from server devices 320, 330 . . . , 340 over a network 360 to an administrator device 390. For example, the server devices 320, 330 . . . , 340 can send the serial output to BMC 310 for transmission to the administrator device 390 over the network 360.

In some implementations, the system 300 can include a UART bridge 350 that connects the server devices 320, 330 . . . , 340 to the BMC 310 using UART protocol. The UART bridge 350 can include a plurality of UART interfaces connected to the serial buses 324, 334 . . . , and 344. In some implementations, the UART bridge 350 can be a Field Programmable Gate Array (FPGA). The UART bridge 350 can include a plurality of UART interfaces connecting the UART bridge 350, through the serial buses 324, 334 . . . , and 344, to the server devices 320, 330 . . . , 340. For example, data can be transmitted between UART bridge 350 and server devices 320, 330 . . . , 340 using UART protocol messages. The UART bridge 350 can function to transform serial output from UART protocol into a specific bus protocol. The UART bridge 350 can also function to transform network commands from the specific bus protocol into serial output according to UART protocol.

In some implementations, the specific bus protocol can be Inter-Integrated Circuit (IIC or I$^2$C) protocol. The IIC protocol features a multi-master, multi-slave, single-ended, serial computer bus that uses a Serial Data Line and a Serial Clock Line with a 7-bit or a 10-bit address space. In some other implementations, the specific bus protocol can be System Management Bus (SMBus) protocol. The SMBus protocol features a single-ended, two-wire bus derived from IIC protocol and uses IIC hardware and IIC addressing.

In some implementations, the UART bridge 350 can send the serial output from the server devices 320, 330 . . . , 340 to the BMC 310, through a plurality of communication buses 352, 354 . . . , and 356 of the specific bus protocol. For example, data can be transmitted between UART bridge 350 and BMC 310 over communication buses 352, 354 . . . , 356 using the IIC protocol. The UART bridge 350 can also receive network commands from the BMC 310, through the plurality of communication buses 352, 354 . . . , and 356 of the specific bus protocol. The UART bridge 350 can send the network commands to the server devices 320, 330 . . . , 340 through the serial buses 324, 334 . . . , and 344.

In some implementations, the BMC 310 can emulate a plurality of virtual BMCs 312, 314 . . . , and 316. For example, the BMC 310 can emulate the virtual BMCs 312, 314 . . . , and 316 with software running on an embedded operating system of the BMC 310. Each of the virtual BMCs 312, 314 . . . , and 316 can perform similar tasks as a traditional BMC corresponding to each server device in traditional server system architecture.

In some implementations, each of the virtual BMCs 312, 314 . . . , and 316 can receive serial data from the respective server device 320, 330 . . . , 340. For example, the first virtual BMC 312 can receive serial data originating from the first server 320, through the communication bus 352. The second virtual BMC 314 can receive serial data originating from the second server 330, through the communication bus 354. The Nth server 316 can receive serial data originating from the Nth server 340, through the communication bus 356. Each of the virtual BMCs 312, 314 . . . , and 316 can also send network commands to the respective server device 320, 330 . . . , 340.

The BMC 310 can communicate with the administrator device 390 through a NIC 380. In some implementations, the BMC 310 can include a router 319 that distinguishes each of the virtual BMCs 312, 314 . . . , 316 in communicating with the administrator device 390 through the NIC 380. For example, the router 319 can specify to the NIC 380 which specific virtual BMC is to communicate with the NIC

380. The router 319 can also specify to the NIC 380 which specific virtual BMC is to receive a network command from the NIC 380. In some implementations, the router can be software running on the embedded operating system of the BMC 310.

The BMC 310 can connect to a NIC 380 through a connection 370 specified by IPMI. The connection 370 can include any bus interface (e.g., SMBus, RS-232, or IPMB). The BMC 310 can send serial output through the connection 370 to the NIC 380. The BMC 310 can also receive network commands through the connection 370 from the NIC 380.

The NIC 380 can include an electronic device that connects to the BMC 310 through a connection 370. The NIC 380 can receive serial output through the connection 370 from the BMC 310. The NIC 380 can also send network commands from the administrator device 390 through the connection 370 to the NIC 380.

The NIC 380 can connect to the administrator device 390 through a network 360. The network 360 can, for example, include a LAN or a wide area network such as the Internet. The administrator device 390 can be a device such as a computer system that receives serial output or sends network commands to manage the server devices 320, 330 . . . , 340. The administrator device 390 can receive the serial data through the network 360 from the NIC 380. The administrator device 390 can also send network commands through the network 360 to the NIC 380.

Figure 4:
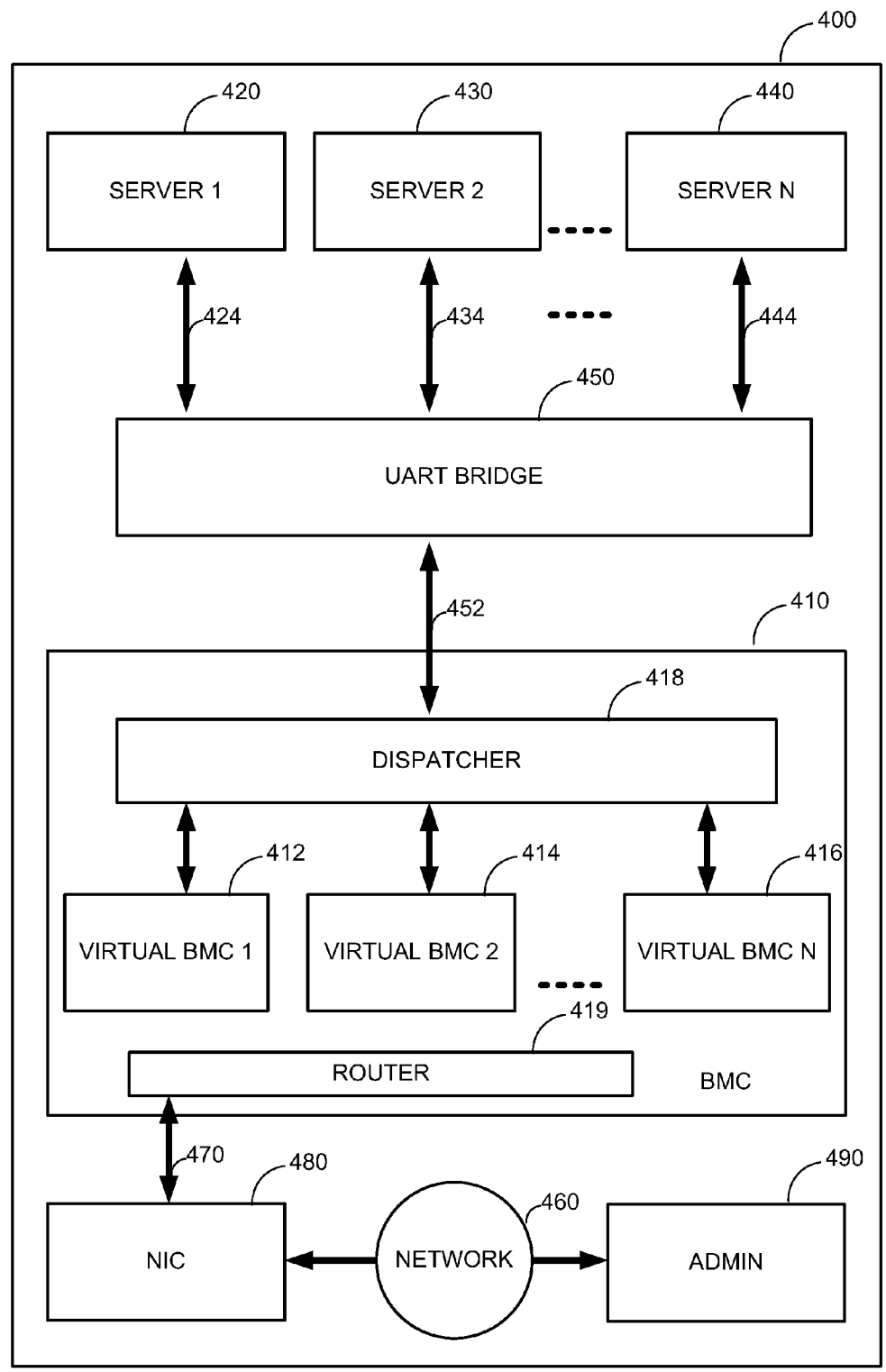
FIG. 4 illustrates a block diagram of an example system for managing serial output from multiple servers using a BMC with a single connection to a bridge.

FIG. 4 illustrates a block diagram of an example system 400 for managing serial output from multiple servers using a BMC with a single connection to a bridge. The system 400 can include an N number of server devices 420, 430 . . . , 440 (e.g., application servers, database servers, file servers, game servers, web servers). Each of the server devices 420, 430 . . . , 440 can generate various serial output (e.g., operational status, sensor data, log data, error data) for use by a user/administrator for debugging and/or analyzing system operations. Similarly, the each of the server devices 420, 430 . . . , 440 can receive various network commands (e.g., power on/off, power cycle, request for status) in the form of serial output.

In some implementations, to manage these server devices input/output serial data through serial ports can be redirected over a network 460 to an administrator device 490. The server devices 420, 430 . . . , 440 can send the serial output to BMC 410 for transmission to the administrator device 490 over the network 460.

In some implementations, the system 400 can include a UART bridge 450 that connects the server devices 420, 430 . . . , 440 to the BMC 410 using UART protocol. The UART bridge 450 can include a plurality of UART interfaces connected to the serial buses 424, 434 . . . , and 444. In some implementations, the UART bridge 450 can be a Field Programmable Gate Array (FPGA). The UART bridge 450 can include a plurality of UART interfaces connecting the UART bridge 450, through the serial buses 424, 434 . . . , and 444, to the server devices 420, 430 . . . , 440. The UART bridge 450 can function to transform serial output from UART protocol into a specific bus protocol. The UART bridge 450 can also function to transform network commands from the specific bus protocol into serial output according to UART protocol.

In some implementations, the specific bus protocol can be Inter-Integrated Circuit (IIC or I²C) protocol. The IIC protocol features a multi-master, multi-slave, single-ended, serial computer bus that uses a Serial Data Line and a Serial Clock Line with a 7-bit or a 10-bit address space. In some other implementations, the specific bus protocol can be System Management Bus (SMBus) protocol. The SMBus protocol features a single-ended, two-wire bus derived from IIC protocol and uses IIC hardware and IIC addressing.

In some implementations, the UART bridge 450 can send the serial output from the server devices 420, 430 . . . , 440 to the BMC 410, through a single communication bus 452, according to the specific bus protocol. The UART bridge 450 can also receive network commands from the BMC 410, through the single communication bus 452, according to the specific bus protocol. The UART bridge 450 can send the network commands to the server devices 420, 430 . . . , 440 through the serial buses 424, 434 . . . , and 444.

The UART bridge 450 can use a method of distinguishing the serial output from each of the server devices 420, 430 . . . , 440 in transmitting the serial output or receiving network commands through the single communication bus 452. In some implementations, the UART bridge 450 can use slave addressing in the IIC protocol to distinguish serial data from different server devices. For example, the UART bridge 450 can use slave address 0x10 to indicate serial data from the first server node 420 and slave address of 0x20 to indicate serial data from the second server node 430.

In some implementations, the BMC can include a dispatcher 418 that receives serial data from the server devices 420, 430 . . . , 440 through the single communication bus 452, according to the specific bus protocol. The dispatcher 418 can also send network commands to the server devices 420, 430 . . . , 440 through the single communication bus 452, according to the specific bus protocol. The dispatcher 418 can use the same method used by the UART bridge 450 in distinguishing the server devices 420, 430 . . . , 440 through the single communication bus 452. For example, the dispatcher 418 can interpret slave address 0x10 to indicate serial data from the first server node 420 and slave address of 0x20 to indicate serial data from the second server node 430.

The BMC 410 can emulate a plurality of virtual BMCs 412, 414 . . . , and 416. For example, the BMC 410 can emulate the virtual BMCs 412, 414 . . . , and 416 with software running on an embedded operating system of the BMC 410. Each of the virtual BMCs 412, 414 . . . , and 416 can perform similar tasks as a traditional BMC corresponding to each server device in traditional server system architecture. Each of the virtual BMCs 412, 414 . . . , and 416 can receive serial data from the respective server device 420, 430 . . . , 440 through the dispatcher 418. For example, the first virtual BMC 412 can receive serial data originating from the first server 420. The second virtual BMC 414 can receive serial data originating from the second server 430. The Nth server 416 can receive serial data originating from the Nth server 440. In some implementations, the BMC 410 can use slave addressing in the IIC protocol to distinguish serial data from different server devices. For example, the BMC 410 can interpret slave address 0x10 to indicate serial data from the first server node 420 and slave address of 0x20 to indicate serial data from the second server node 430. Dispatcher 418 can use the slave addresses to route the serial output data received from server devices 420, 430 . . . , 440 to the appropriate virtual BMC. For example, dispatcher 418 can have a routing table that associates slave addresses to virtual BMCs so that the serial output from a particular server is correctly routed to the corresponding virtual BMC.

The BMC 410 can communicate with the administrator device 490 through a NIC 480. In some implementations, the BMC 410 can include a router 419 that distinguishes each of the virtual BMCs 412, 414 . . . , 416 in communicating with the administrator device 490 through the NIC 480. For example, the router 419 can route command messages received from administrator device 490 through NIC 480 to the intended recipient virtual BMC, as described above.

The BMC 410 can connect to a NIC 480 through a connection 470 specified by IPMI. The connection 470 can include any bus interface (e.g., SMBus, RS-232, or IPMB). The BMC 410 can send serial output through the connection 450 to the NIC 480. The BMC 410 can also receive network commands through the connection 450 from the NIC 480.

The NIC 480 can include an electronic device that connects to the BMC 410 through a connection 470. The NIC 480 can receive serial output through the connection 470 from the BMC 410. The NIC 480 can also send network commands from the administrator device 490 through the connection 470 to the NIC 480.

The NIC 480 can connect to the administrator device 490 through a network 460. The network 460 can, for example, include a local area network (LAN) or a wide area network such as the Internet. The administrator device 490 can be a device such as a computer system that receives serial output or sends network commands to manage the server devices 420, 430 . . . , 440. The administrator device 490 can receive the serial data through the network 460 from the NIC 480. The administrator device 490 can also send network commands through the network 460 to the NIC 480.

Figure 5:
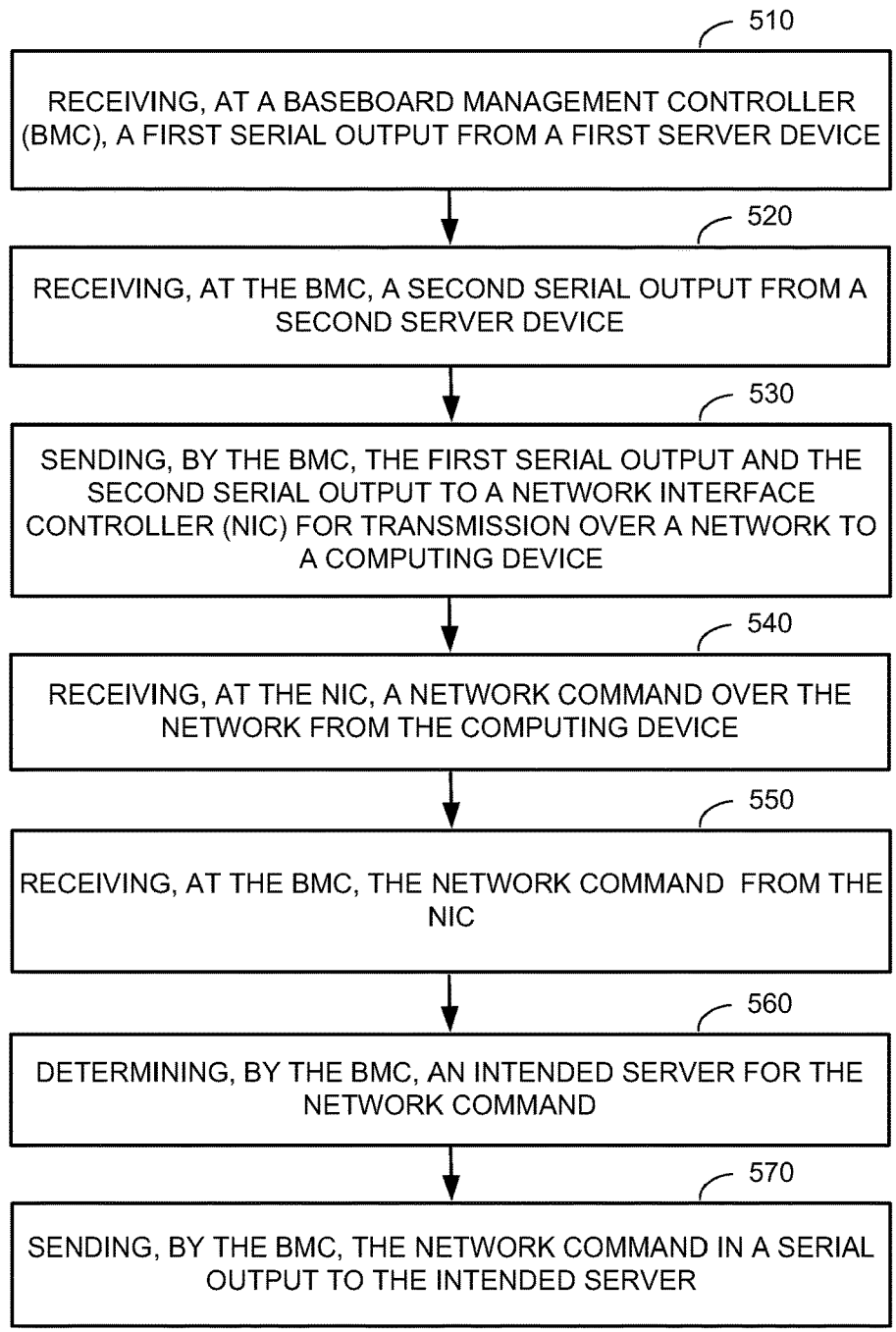
FIG. 5 illustrates an example method for managing serial output from multiple servers using a single baseboard management controller.

FIG. 5 illustrates an example method 500 for managing serial output from multiple servers using a single baseboard management controller. In some implementations, serial output from the multiple servers can be redirected over a network to an administrator device.

At step 510, a BMC can receive a first serial output from a first server device. For example, the first server device can generate various serial output (e.g., operational status, sensor data, log data, error data) for use by a user/administrator for debugging and/or analyzing system operations. In some implementations, the first server device can include a UART interface to transmit the serial output using UART protocol. In some implementations, BMC can receive the serial output through a serial bus from the UART interface of the first server device. In some implementations, the BMC can include at least two UART interfaces connecting the BMC, through serial buses to the first server device and the second server device. In some implementations, a UART bridge can connect the first server device to the BMC. The UART bridge can function to transform network commands from the specific bus protocol (e.g., IIC protocol) into serial output according to UART protocol. In some implementations, the specific bus protocol can be Inter-Integrated Circuit (IIC or I²C) protocol or SMBus protocol.

At step 520, the BMC can receive a second serial output from a second server device. In some implementations, the BMC can receive the second serial output from the second server device in a similar manner as receiving the first serial output from the first server device in step 510. In some implementations, the BMC can include a dispatcher that receives serial data from the first server device and the second server device through a single communication bus, according to the specific bus protocol. In some implementations, instead of requiring multiple BMCs to redirect serial output for each of the first server device and the second server device, the BMC can emulate a first virtual BMC and a second virtual BMC.

At step 530, the BMC can send the first serial output and the second serial output to a NIC for transmission over a network to a computing device (e.g., an administrator device). For example, the BMC can connect to the NIC through a connection specified by IPMI (e.g. SMBUS, RS-232, IPM). The NIC can connect to the computing device through a network (e.g. LAN or the Internet).

At optional step 540, the NIC can receive a network command over the network from the computing device. For example, an administrator device can send various network commands for an intended server (e.g., power on/off, power cycle, request for status) over a network to the NIC. The messages containing the commands can conform to the IPMI protocol, as described above.

At optional step 550, the BMC can receive the network command from the NIC. In some implementations, the NIC can forward network commands from the administrator device through the connection (e.g. SMBUS, RS-232, IPM) to the BMC.

At optional step 560, the BMC can determine an intended server for the network command. In some implementations, the BMC can include a router that distinguishes each of the virtual BMCs in communicating with the NIC.

At optional step 570, the BMC can send the network command in a serial output to the intended server. In some implementations, the BMC includes a dispatcher that can send network commands to the first server device and the second server device through the single communication bus, according to the specific bus protocol.

Figure 6:
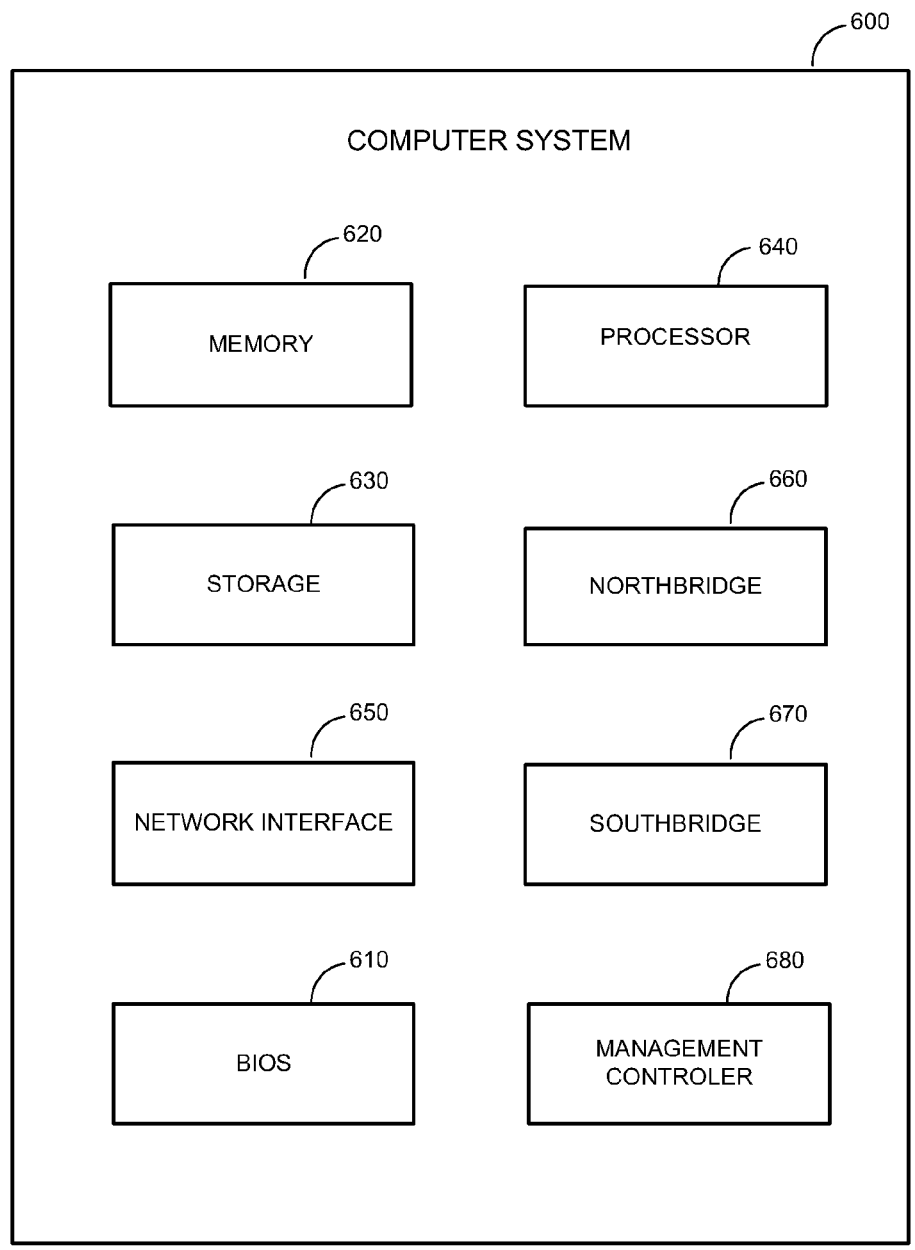
FIG. 6 illustrates a block diagram of an example computer system.

FIG. 6 illustrates a block diagram of an example computer system 600. The computer system 600 can include a processor 640, a network interface 650, a management controller 680, a memory 620, a storage 630, a BIOS 610, a northbridge 660, and a southbridge 670.

The computer system 600 can be, for example, a server (e.g., a server in a server rack of a data center) or a personal computer. The processor (e.g., central processing unit (CPU)) 640 can be a chip on a motherboard that can retrieve and execute programming instructions stored in the memory 620. The processor 640 can be a single CPU with a single processing core, a single CPU with multiple processing cores, or multiple CPUs. One or more buses (not shown) can transmit instructions and application data between various computer components such as the processor 640, memory 620, storage 630, and networking interface 650.

The memory 620 can include any physical device used to temporarily or permanently store data or programs, such as various forms of random-access memory (RAM). The storage 630 can include any physical device for non-volatile data storage such as a HDD or a flash drive. The storage 630 can have a greater capacity than the memory 620 and can be more economical per unit of storage, but can also have slower transfer rates.

The BIOS 610 can include a Basic Input/Output System or its successors or equivalents, such as an Extensible Firmware Interface (EFI) or Unified Extensible Firmware Interface (UEFI). The BIOS 610 can include a BIOS chip located on a motherboard of the computer system 600 storing a BIOS software program. The BIOS 610 can store firmware executed when the computer system is first powered on along with a set of configurations specified for the BIOS 610. The BIOS firmware and BIOS configurations can be stored in a non-volatile memory (e.g., NVRAM) or a ROM such as flash memory. Flash memory is a non-volatile computer storage medium that can be electronically erased and reprogrammed.

The BIOS 610 can be loaded and executed as a sequence program each time the computer system 600 is started. The BIOS 610 can recognize, initialize, and test hardware present in a given computing system based on the set of configurations. The BIOS 610 can perform self-test, such as a Power-on-Self-Test (POST), on the computer system 600. This self-test can test functionality of various hardware components such as hard disk drives, optical reading devices, cooling devices, memory modules, expansion cards and the like. The BIOS can address and allocate an area in the memory 620 in to store an operating system. The BIOS 610 can then give control of the computer system to the OS.

The BIOS 610 of the computer system 600 can include a BIOS configuration that defines how the BIOS 610 controls various hardware components in the computer system 600. The BIOS configuration can determine the order in which the various hardware components in the computer system 600 are started. The BIOS 610 can provide an interface (e.g., BIOS setup utility) that allows a variety of different parameters to be set, which can be different from parameters in a BIOS default configuration. For example, a user (e.g., an administrator) can use the BIOS 610 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 680 can be a specialized microcontroller embedded on the motherboard of the computer system. For example, the management controller 680 can be a baseboard management controller (BMC). The management controller 680 can manage the interface between system management software and platform hardware. Different types of sensors built into the computer system can report to the management controller 680 on parameters such as temperature, cooling fan speeds, power status, operating system status, etc. The management controller 680 can monitor the sensors and have the ability to send alerts to an administrator via the network interface 650 if any of the parameters do not stay within preset limits, indicating a potential failure of the system. The administrator can also remotely communicate with the management controller 680 to take some corrective action such as resetting or power cycling the system to restore functionality.

The northbridge 660 can be a chip on the motherboard that can be directly connected to the processor 640 or can be integrated into the processor 640. In some instances, the northbridge 660 and the southbridge 670 can be combined into a single die. The northbridge 660 and the southbridge 670, manage communications between the processor 640 and other parts of the motherboard. The northbridge 660 can manage tasks that require higher performance than the southbridge 670. The northbridge 660 can manage communications between the processor 640, the memory 620, and video controllers (not shown). In some instances, the northbridge 660 can include a video controller.

The southbridge 670 can be a chip on the motherboard connected to the northbridge 660, but unlike the northbridge 660, is not directly connected to the processor 640. The southbridge 670 can manage input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 600. The southbridge 670 can connect to or can include within the southbridge 670 the management controller 670, Direct Memory Access (DMAs) controllers, Programmable Interrupt Controllers (PICs), and a real-time clock.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more example designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:
1. A method comprising:
  receiving, at a baseboard management controller (BMC), a first serial output from a first server device, the BMC being directly connected to the first server device using Universal Asynchronous Receiver/Transmitter (UART) protocol;

receiving, at the BMC, a second serial output from a second server device, the BMC being directly connected to the second server device using the UART protocol, the second server device being separate from the first server device;

sending, by the BMC, the first serial output and the second serial output to a network interface controller (NIC) for transmission over a network to a computing device;

receiving, at the BMC, a network command from the NIC, the network command received from the computing device over the network;

determining, by the BMC, an intended server for the network command; and sending, by the BMC, the network command in a serial output to the intended server.

2. The method of claim 1, further comprising:
receiving, at the NIC, the network command over the network from the computing device.

3. The method of claim 1, wherein the BMC receives the first serial output and the second serial output, transmitted according to the UART protocol.

4. The method of claim 3, wherein the BMC comprises a first BMC UART interface for receiving the first serial output and a second BMC UART interface for receiving the second serial output.

5. The method of claim 1, further comprising:
emulating, by the BMC, a first virtual BMC and a second virtual BMC;
receiving, at the first virtual BMC, the first serial output from the first server; and
receiving, at the second virtual BMC, the second serial output from the second server.

6. The method of claim 5, further comprising:
sending, by the first virtual BMC, the first serial output to the NIC; and
sending, by the second virtual BMC, the second serial output to the NIC.

7. The method of claim 5, further comprising:
receiving, at a UART bridge, the first serial output from the first server and the second serial output from the second server, transmitted according to UART protocol;
transforming the first serial output and the second serial output from UART protocol to a bus protocol; and
sending, by the UART bridge, the first serial output and the second serial output to the BMC, transmitted according to the bus protocol.

8. The method of claim 7, wherein the UART bridge comprises a Field Programmable Gate Array (FPGA) comprising a first bridge UART interface for receiving the first serial output and a second bridge UART interface for receiving the second serial output.

9. The method of claim 7, wherein the UART bridge sends the first serial output to the BMC through a first communication bus of the bus protocol, and sends the second serial output to the BMC through a second communication bus of the bus protocol.

10. The method of claim 7, wherein the bus protocol is Inter-Integrated Circuit (IIC) protocol.

11. The method of claim 7, wherein the bus protocol is System Management Bus (SMBus) protocol.

12. The method of claim 7, wherein the UART bridge sends the first serial output and the second serial output to the BMC through a single communication bus of the bus protocol.

13. The method of claim 12, wherein the BMC comprises a dispatcher to map the first serial output and the second serial output from the single communication bus to the first virtual BMC and the second virtual BMC, respectively.

14. The method of claim 13, wherein the dispatcher uses slave addresses to distinguish the first serial output from the second serial output.

15. A system comprising:
a first server device;
a second server device;
a network interface controller (NIC);
a baseboard management controller (BMC); and
a non-transitory computer-readable medium including one or more sequences of instructions which, when executed by the BMC, causes the BMC to:
receive a first serial output from the first server, the BMC being directly connected to the first server device using Universal Asynchronous Receiver/Transmitter (UART) protocol;
receive a second serial output from the second server, the BMC being directly connected to the second server device using the UART protocol, the second server device being separate from the first server device; and
send the first serial output and the second serial output to the NIC for transmission over a network to a computing device;
receive, at the BMC, a network command from the NIC, the network command received from the computing device over the network;
determine, by the BMC, an intended server for the network command; and
send, by the BMC, the network command in a serial output to the intended server.

16. The system of claim 15, wherein the instructions further cause the BMC to:
cause the NIC to receive the network command over the network from the computing device.

17. The system of claim 15, wherein the instructions further cause the BMC to:
emulate a first virtual BMC and a second virtual BMC;
receive the first serial output at the first virtual BMC; and
receive the second serial output at the second virtual BMC.

18. The system of claim 17, further comprising a UART bridge that receives the first serial output and the second serial output, transforms the first serial output and the second serial output from UART protocol to a bus protocol, and sends the first serial output and the second serial output to the BMC.

19. The system of claim 18, wherein the UART bridge sends the first serial output to the BMC through a first communication bus of the bus protocol, and sends the second serial output to the BMC through a second communication bus of the bus protocol.

20. The system of claim 18, wherein the UART bridge sends the first serial output and the second serial output to the BMC through a single communication bus of the bus protocol.

* * * * *